US012802713B2

(12) United States Patent
Belanich et al.

(10) Patent No.: US 12,802,713 B2
(45) Date of Patent: Nov. 17, 2026

(54) LANGUAGE-MODEL SUPPORTED SPEECH EMOTION RECOGNITION

(71) Applicant: Google LLC, Mountain View, CA (US)

(72) Inventors: Josh Belanich, Brooklyn, NY (US); Taesik Gong, Seo-gu (KR); Krishna Somandepalli, New York, NY (US); Brian Eoff, Lexington, MA (US); Brendan Wesley Jou, New York, NY (US); Arsha Nagrani, Cambridge, MA (US)

(73) Assignee: Google LLC, Mountain View, CA (US)

( * ) Notice: Subject to any disclaimer, the term of this patent is extended or adjusted under 35 U.S.C. 154(b) by 206 days.

(21) Appl. No.: 18/235,372

(22) Filed: Aug. 18, 2023

(65) Prior Publication Data

US 2025/0061917 A1 Feb. 20, 2025

(51) Int. Cl.

| | |
|---|---|
| ***G10L 25/63*** | (2013.01) |
| ***G06F 40/279*** | (2020.01) |
| ***G06F 40/30*** | (2020.01) |
| ***G10L 15/06*** | (2013.01) |

(52) U.S. Cl.
CPC ............ *G10L 25/63* (2013.01); *G06F 40/279* (2020.01); *G06F 40/30* (2020.01); *G10L 15/063* (2013.01)

(58) Field of Classification Search
CPC ..... G10L 25/63; G10L 15/063; G06F 40/279; G06F 40/30
See application file for complete search history.

(56) References Cited

U.S. PATENT DOCUMENTS

| | | | |
|---|---|---|---|
| 8,204,747 | B2 | 6/2012 | Kato et al. |
| 10,347,244 | B2 | 7/2019 | Goel et al. |
| 11,496,582 | B2 | 11/2022 | Rastrow et al. |

(Continued)

OTHER PUBLICATIONS

Plaza-del-Arco, Flor Miriam, Maria-Teresa Martin-Valdivia, and Roman Klinger, "Natural Language Inference Prompts for Zero-shot Emotion Classification in Text across Corpora", Oct. 2022, Proceedings of the 29th International Conference on Computational Linguistics, pp. 6805-6817. (Year: 2022).*

(Continued)

*Primary Examiner* — James Boggs
(74) *Attorney, Agent, or Firm* — Botos Churchill IP Law LLP

(57) ABSTRACT

The technology relates to enhancing speech emotion recognition models with methods that enable the use of unlabeled data by inferring weak emotion labels. This is done by pre-trained large language models through weakly-supervised learning. For inferring weak labels constrained to a taxonomy, a textual entailment approach selects an emotion label with the highest entailment score for a speech transcript extracted via automatic speech recognition. The system may employ a method that generates, by one or more processors, a text transcript for a snippet of input speech, and then applies the text transcript to a pre-trained language model. The system can generate, using the pre-trained language model according to an engineered prompt and a predetermined taxonomy, a textual entailment from the text (Continued)

transcript. Based on this, the system may generate, by the one or more processors using the textual entailment, a predicted emotion corresponding to the input speech.

17 Claims, 13 Drawing Sheets

(56) References Cited

U.S. PATENT DOCUMENTS

| | | | |
|---|---|---|---|
| 11,521,639 B1 | 12/2022 | Shon et al. | |
| 2022/0292261 A1* | 9/2022 | Movshovitz-Attias | G06F 40/289 |
| 2022/0366893 A1 | 11/2022 | Qu et al. | |
| 2023/0154487 A1 | 5/2023 | Huang et al. | |
| 2024/0028838 A1* | 1/2024 | Compton | G06F 40/40 |

OTHER PUBLICATIONS

Ghriss, Ayoub, Bo Yang, Viktor Rozgic, Elizabeth Shriberg, and Chao Wang, "Sentiment-aware Automatic Speech Recognition Pre-training for Enhanced Speech Emotion Recognition", May 2022, 2022 IEEE International Conference on Acoustics, Speech and Signal Processing (ICASSP 2022), pp. 7347-7351. (Year: 2022).*
Bhaumik, Ankita, Andy Bernhardt, Gregorios A. Katsios, Ning Sa, and Tomek Strzalkowski, "Adapting Emotion Detection to Analyze Influence Campaigns on Social Media", Jul. 2023, Proceedings of the 13th Workshop on Computational Approaches to Subjectivity, Sentiment, & Social Media Analysis, pp. 441-451. (Year: 2023).*
Gong, Taesik, Josh Belanich, Krishna Somandepalli, Arsha Nagrani, Brian Eoff, and Brendan Jou, "LanSER: Language-Model Supported Speech Emotion Recognition", Aug. 2023, Proceedings of Interspeech 2023, pp. 2408-2412. (Year: 2023).*
Mohammad, Saif M., Felipe Bravo-Marquez, Mohammad Salameh, and Svetlana Kiritchenko, "SemEval-2018 Task 1: Affect in Tweets", Jun. 2018, Proceedings of the 12th International Workshop on Semantic Evaluation, pp. 1-17. (Year: 2018).*
Deng, Jun, Xinzhou Xu, Zixing Zhang, Sascha Frühholz, and Björn Schuller, "Semisupervised Autoencoders for Speech Emotion Recognition", Jan. 2018, IEEE/ACM Transactions on Audio, Speech and Language Processing (TASLP), vol. 26, No. 1, pp. 31-43. (Year: 2018).*
Basile, Angelo, Guillermo Pérez-Torró, and Marc Franco-Salvador, "Probabilistic Ensembles of Zero-and Few-Shot Learning Models for Emotion Classification", Sep. 2021, Proceedings of the International Conference on Recent Advances in Natural Language Processing (RANLP 2021), pp. 128-137. (Year: 2021).*
Demszky, Dorottya, Dana Movshovitz-Attias, Jeongwoo Ko, Alan Cowen, Gaurav Nemade, and Sujith Ravi, "GoEmotions: A Dataset of Fine-Grained Emotions", Jul. 2020, Annual Meeting of the Association for Computational Linguistics, vol. 13, p. 4040-4054. (Year: 2020).*
Yin, Wenpeng, Jamaal Hay, and Dan Roth, "Benchmarking Zero-shot Text Classification: Datasets, Evaluation and Entailment Approach", Nov. 2019, Proceedings of the 2019 Conference on Empirical Methods in Natural Language Processing (EMNLP-IJCNLP), pp. 3914-3923. (Year: 2019).*
Wang, Yibo, Congying Xia, Guan Wang, and Philip Yu, "Continuous Prompt Tuning Based Textual Entailment Model for E-commerce Entity Typing", Nov. 2022, arXiv preprint arXiv:2211.02483. (Year: 2022).*
Ge, Jiaxin, Hongyin Luo, Yoon Kim, and James Glass, "Entailment as Robust Self-Learner", Jul. 2023, Proceedings of the 61st Annual Meeting of the Association for Computational Linguistics (vol. 1: Long Papers), pp. 13803-13817. (Year: 2023).*
Luo, Hongyin, and James Glass, "Logic Against Bias: Textual Entailment Mitigates Stereotypical Sentence Reasoning", May 2023, Proceedings of the 17th Conference of the European Chapter of the Association for Computational Linguistics, pp. 1243-1254. (Year: 2023).*
Kim, Ethan, and Jerry Yang, "Differentiable Entailment for Parameter Efficient Few Shot Learning", Jan. 2023, arXiv preprint arXiv:2301.13345. (Year: 2023).*
Abadi, M. , et al., TensorFlow: Large-scale machine learning on heterogeneous systems, 2015, software available from tensorflow.org, 19 pgs.
Bain, M. , et al., Condensed movies: Story based retrieval with contextual embeddings, 2020, 17 pgs.
Brown, T. , et al., "Language models are few-shot learners," in Advances in Neural Information Processing Systems, H. Larochelle, M. Ranzato, R. Hadsell, M. Balcan, and H. Lin, Eds., vol. 33. Curran Associates, Inc., 2020, 25 pgs.
Busso, C. , et al., Iemocap: Interactive emotional dyadic motion capture database, Language resources and evaluation, vol. 42, No. 4, 30 p. , 2008.
Cao, H. , et al., Crema-d: Crowd-sourced emotional multimodal actors dataset, IEEE Transactions on Affective Computing, vol. 5, No. 4, 41 pgs., 2014.
Cowen, A.S. , et al., How emotion is experienced and expressed in multiple cultures: a large-scale experiment, Jun. 2021, 36 pgs.
Cowen, A.S. , et al., Self-report captures 27 distinct categories of emotion bridged by continuous gradients, Proceedings of the national academy of sciences, vol. 114, No. 38, pp. E7900-E7909, 2017.
Deng, S. , et al., "Learning to compose diversified prompts for image emotion classification," CoRR, vol. abs/2201.10963, 2022, arXiv:2201.10963v2 [cs.CV] May 30, 2022, 10 pgs.
Devlin, J. , et al., "BERT: Pretraining of deep bidirectional transformers for language understanding," in NAACL. Minneapolis, Minnesota: Association for Computational Linguistics, 2019, 16 pgs.
Galvez, D. , et al., The people's speech: A large-scale diverse english speech recognition dataset for commercial usage, in Thirty-fifth Conference on Neural Information Processing Systems Datasets and Benchmarks Track (Round 1), 2021, 12 pgs.
Gao, T. , et al., "Making pre-trained language models better few-shot learners", in Proc of the 59th Annual Meeting of the Assoc for Comp Linguistics and the 11th Intl. Jt Conf on Natural Lang Proc (vol. 1: Long Papers). Online: Assoc for Comp. Linguistics, 2021, 15 pgs.
Ghriss, Ayoub , et al., Sentiment-aware automatic speech recognition pre-training for Enhanced speech emotion recognition, arXiv:2201.11826v1 [cs.CL] Jan. 27, 2022, 6 pgs.
He, K. , et al., Deep residual learning for image recognition, in 2016 IEEE Conference on Computer Vision and Pattern Recognition (CVPR). Los Alamitos, CA, USA: IEEE Computer Society, Jun. 2016, pp. 770-778.
Kingma, D.P., et al., Adam: A method for stochastic optimization, in International Conference on Learning Representations (ICLR), 2015, 13 pgs.
Lester, B. , et al., The power of scale for parameter-efficient prompt tuning, in Proceedings of EMNLP. Online and Punta Cana, Dominican Republic: Association for Computational Linguistics, Nov. 2021, 15 pgs.
Liang, P. , et al., "Holistic evaluation of language models," arXiv preprint arXiv:2211.09110, 2022, 163 pgs.
Liu, P. , et al., "Pre-train, prompt, and predict: A systematic survey of prompting methods in natural language processing," ACM Comput. Surv., Sep. 2022, 35 pgs.
Liu, Y. , et al., "Roberta: A robustly optimized BERT pretraining approach," CoRR, vol. abs/1907.11692, 2019, 13 pgs.
Mikolov, T. , et al., "Distributed representations of words and phrases and their compositionality", in Proceedings of the 26th International Conference on Neural Info Processing Systems—vol. 2, ser. NIPS'13. Red Hook, NY, USA: Curran Associates Inc., 2013, 9 pgs.
Radford, A. , et al., "Language models are unsupervised multitask learners," 2019, 24 pgs.
Radford, A. , et al., Robust speech recognition via large-scale weak supervision, Tech. Rep., Technical report, OpenAI, Tech. Rep., 2022, 28 pgs.

(56) References Cited

OTHER PUBLICATIONS

Radford, A. , et al., "Learning transferable visual models from natural language supervision", in Proceedings of the 38th International Conference on Machine Learning, ser. Proceedings of Machine Learning Research, M. Meila and T. Zhang, Eds., vol. 139. PMLR, Jul. 18-24, 2021, pp. 8748-8763.
Sap, M. , et al., "Social IQa: Commonsense reasoning about social interactions," in proceedings of EMNLP-IJCNLP. Hong Kong, China:Association for Computational Linguistics, Nov. 2019, pp. 4463-4473. [Online]. Available: https://aclanthology.org/D19-1454, 11 pgs.
Schneider, S. , et al., "wav2vec: Unsupervised Pre-Training for Speech Recognition," in Proc. Interspeech 2019, 2019, 9 pgs.
Shon, S. , et al., "Leveraging pre-trained language model for speech sentiment analysis," INTERSPEECH, 2021, 5 pgs.
Shon, Suwon , et al., Leveraging pre-trained language model for speech sentiment analysis, arXiv:2106.06598v1 [cs.CL] Jun. 11, 2021, 5 pgs.
Shor, J. , et al., "Universal paralinguistic speech representations using self-supervised conformers," in ICASSP 2022—2022 IEEE International Conference on Acoustics, Speech and Signal Processing (ICASSP), 2022, 5 pgs.
Wenpeng, J.H. , et al., "Benchmarking zero-shot text classification: Datasets, evaluation and entailment approach," in EMNLP, 2019, 10 pgs.
Williams, A. , et al., "A broad-coverage challenge corpus for sentence understanding through inference," in NAACL. Association for Computational Linguistics, 2018, 11 pgs.
Yang, A. , et al., "Just ask:Learning to answer questions from millions of narrated videos," in Proceedings of ICCV, 2021, pp. 1686-1697.
Yang, S.-W , et al., "Superb: Speech processing universal performance benchmark," INTERSPEECH, 2021, arXiv:2105.01051v4 [cs.CL] Oct. 15, 2021, 6 pgs.
Zhao, J. , et al., "Memobert: Pre-training model with prompt-based learning for multimodal emotion recognition," in ICASSP 2022—2022 IEEE International Conference on Acoustics, Speech and Signal Processing (ICASSP), 2022, 5 pgs.
Zhao, J. , et al., "Missing modality imagination network for emotion recognition with uncertain missing modalities", in Proceedings of the 59th Annual Meeting of the Assoc for Computational Linguistics and the 11th International Joint Conf on Natural Language Proc (vol. 1: Long Papers). Online: Assoc for Comp Ling, Aug. 2021, pp. 2608-2618.

* cited by examiner

Fig. 3A

Text generation

| | Transcript | Prompt |
| --- | --- | --- |
| Input: | "Stop. I hate you. Do you hear me?" | "This person is expressing" |

Outputs:

1. "disgust with me? I'm not that dumb. I hate you because of me…"
2. "her hatred, what for? All I did was say. 'You're not just some angry…"
3. "persona anger against you. I don't know what to think about that's you…"

Fig. 3B

Filling mask

| | Transcript | Prompt |
| --- | --- | --- |
| Input: | "Stop. I hate you. Do you hear me?" | "This person is expressing {MASK}" |

Outputs:

1. "hate"
2. "pain"
3. "himself"

Fig. 4

Table 1

| Prompts | Acc. |
|---|---|
| This example is {}. | 42.0% |
| I am {}. [8] | 39.9% |
| I feel {}. | 41.8% |
| I am feeling {}. | 45.0% |
| This person is expressing {} emotion. | 43.7% |
| A speech seems to express a feeling like {}. | 38.0% |
| A transcript seems to express a feeling like {}. | 38.9% |
| A conversation seems to express some feelings like {}. | 39.0% |
| The emotion of the conversation is {}. | **45.6%** |
| The emotion of the previous conversation is {}. | 44.1% |
| The overall emotion of the conversation is {}. | 45.1% |

Fig. 5

Table 2

| Downstream task | Method/ Fine-tuning data: | 10% | 30% | 50% | 70% | 100% |
|---|---|---|---|---|---|---|
| IEMOCAP | Majority | 30.9% | 30.9% | 30.9% | 30.9% | 30.9% |
| | GT Transcript + Word2Vec | 34.9% | 34.9% | 34.9% | 34.9% | 34.9% |
| | GT Transcript + Entailment | 47.5% | 47.5% | 47.5% | 47.5% | 47.5% |
| | Supervised | 38.5% | 41.8% | 45.5% | 46.0% | 47.6% |
| | LanSER (People's Speech) | 42.0% | 47.1% | 47.2% | **50.0%** | 50.6% |
| | LanSER (Condensed Movies) | **50.0%** | **51.7%** | **48.0%** | 45.4% | **54.5%** |
| CREMA-D | Majority | 17.1% | 17.1% | 17.1% | 17.1% | 17.1% |
| | GT Transcript + Word2Vec | 19.1% | 19.1% | 19.1% | 19.1% | 19.1% |
| | GT Transcript + Entailment | 16.1% | 16.1% | 16.1% | 16.1% | 16.1% |
| | Supervised | 37.8% | 43.2% | 48.2% | 53.4% | 57.2% |
| | LanSER (People's Speech) | 35.5% | 48.2% | 51.5% | 52.7% | 55.8% |
| | LanSER (Condensed Movies) | **43.7%** | **49.9%** | **52.2%** | **53.6%** | **58.7%** |

Fig. 6

Table 3

| Downstream task | Method | Accuracy |
|---|---|---|
| IEMOCAP | LanSER (random labels) | 47.6% |
| | LanSER (weak labels) | **54.5%** |
| CREMA-D | LanSER (random labels) | 50.6% |
| | LanSER (weak labels) | **58.7%** |

Fig. 7

Table 4

| Downstream task | Method | Accuracy |
|---|---|---|
| IEMOCAP | Scratch | 22.9% |
| | LanSER (People's Speech) | 30.9% |
| | LanSER (Condensed Movies) | **34.3%** |
| CREMA-D | Scratch | 16.3% |
| | LanSER (People's Speech) | 15.9% |
| | LanSER (Condensed Movies) | **23.5%** |

900

LANGUAGE-MODEL SUPPORTED SPEECH EMOTION RECOGNITION

BACKGROUND

In conversations, humans rely on both what is said (lexical content), and how it is said (prosody), to infer the emotional expression of a speaker. Typical methods in speech emotion recognition (SER) leverage the interplay of these two components for modeling emotional expression in speech. However, such methods have limitations with in-the-wild scenarios due to the variability in natural speech, and the reliance on human ratings using limited emotion taxonomies. Extending model training to large, natural speech datasets labeled by humans for nuanced emotion taxonomies can be expensive in computational cost, time and other resources, and is further complicated by the subjective nature of emotion perception.

BRIEF SUMMARY

The technology relates to enhancing speech emotion recognition models with methods that enable the use of unlabeled data by inferring weak emotion labels via pre-trained large language models through weakly-supervised learning. For inferring weak labels constrained to a taxonomy, a textual entailment approach is employed that selects an emotion label with the highest entailment score for a speech transcript extracted via automatic speech recognition. Technical benefits of this approach include providing improved label efficiency, and effective modeling the prosodic content of speech. Textual entailment provides a technical solution by generating a predicted emotion corresponding to the input speech, which can be used in a variety of applications to select and provide tailored information to a user. By way of example, this can be done in a recommendation system that tailors results based on, e.g., a particular emotion. In addition, closed captioning or subtitles can be presented along with a video to indicate the emotion of a speaker. The technology is also complementary to self-supervised learning, for instance in a combined approach to train SER models.

According to one aspect of the technology, a method comprises: generating, by one or more processors, a text transcript for a snippet of input speech: applying, by the one or more processors, the text transcript to a pre-trained language model: generating, using the pre-trained language model according to an engineered prompt and a predetermined taxonomy, a textual entailment from the text transcript; and generating, by the one or more processors using the textual entailment, a predicted emotion corresponding to the input speech.

The predicted emotion may be applied as a weak label to train a speech emotion recognition (SER) model for weakly-supervised learning of the SER model. Here, training the SER model may include: generating an SER predicted emotion using the SER model; and comparing the weak label against the SER predicted emotion. The comparing may include evaluating a probability for each emotion in the predetermined taxonomy. In this case, the evaluating may be performed according to a cross-entropy loss function. Alternatively or additionally to the above, the method may further comprise fine-tuning the SER model by evaluating the SER predicted emotion to one or more ground truth labels. Alternatively or additionally to the above, at least one of the pre-trained language model or the SER model may have a transformer architecture.

The pre-trained language model may be trained via token masking. The pre-trained language model may be constrained to output a set of words that correspond to emotion perception. In this case, the pre-trained language model may be constrained by selecting the predetermined taxonomy according to a set of words or phrases corresponding to a specific app or product.

According to another aspect of the technology, a system comprises memory configured to store one or more language models, and one or more processors operatively coupled to the memory. The one or more processors are configured to: generate a text transcript for a snippet of input speech: apply the text transcript to a pre-trained language model stored that is stored in the memory: generate, using the pre-trained language model according to an engineered prompt and a predetermined taxonomy, a textual entailment from the text transcript; and generate, using the textual entailment, a predicted emotion corresponding to the input speech.

The one or more processors may be further configured to: apply the predicted emotion as a weak label to train a speech emotion recognition (SER) model for weakly-supervised learning of the SER model; and to store the SER model in the memory. Here, training the SER model may include: generation of an SER predicted emotion using the SER model; and comparison of the weak label against the SER predicted emotion. The comparison may include evaluation of a probability for each emotion in the predetermined taxonomy. The evaluation may be performed according to a cross-entropy loss function. Alternatively or additionally to the above, the one or more processors may be further configured to fine-tune the SER model by evaluation of the SER predicted emotion to one or more ground truth labels. Alternatively or additionally to the above, at least one of the pre-trained language model or the SER model may have a transformer architecture.

The pre-trained language model may be trained via token masking. The pre-trained language model may be constrained to output a set of words that correspond to emotion perception. In this case, the pre-trained language model may be constrained by selecting the predetermined taxonomy according to a set of words or phrases corresponding to a specific app or product.

BRIEF DESCRIPTION OF THE DRAWINGS

FIGS. 3A-C compare three weak label generation approaches using text generation, filling mask, and textual entailment, respectively.

FIG. 4 presents a table of results regarding accuracy of extracted weak emotion labels with various prompts, in accordance with aspects of the technology.

FIG. 5 presents a table of results regarding classification accuracy of fine-tuning for downstream tasks when varying a percentage of fine-tuning data, in accordance with aspects of the technology.

FIG. 6 presents a table of results regarding classification accuracy percentage for fine-tuning on downstream tasks, in accordance with aspects of the technology.

FIG. 7 presents a table of results for zero-shot classification accuracy percentages of SER models, in accordance with aspects of the technology.

DETAILED DESCRIPTION

The technology employs a textual entailment approach in conjunction with a large language model (LLM) to infer weak emotion labels from speech content, which can be used to pre-train a SER model.

Despite both lexical content and prosody being complementary for emotion perception, the two components are correlated, and in many cases the content is predictive of the prosody. For example, when someone says, "I won the lottery"—an upbeat and lively prosody would sound congruent, and one might perceive the emotional expression as elation or triumphant. Aspects of the technology leverage the emotions congruent with lexical content in large unlabeled speech datasets to serve as weak supervision for developing SER models.

LLMs can be used to infer expressed emotion categories in textual context. Due to the knowledge that they embed from pre-training on a large text corpus, LLMs can be beneficial in numerous downstream tasks, such as social and emotion reasoning. As discussed herein, LLMs may be leveraged in a language-model supported speech emotion recognition (or "LanSER") approach to infer emotion categories from speech content (e.g., transcribed text), which serve as weak labels for SER. FIG. 1 illustrates an example 100 of this approach, which enables pretraining a SER model on large speech datasets without human labels by (1) extracting text transcripts from utterances using automatic speech recognition (ASR), (2) using pre-trained LLMs to infer weak emotion labels with an engineered prompt and predetermined taxonomy, and (3) pre-training the SER model with the weak labels.

Figure 1A:
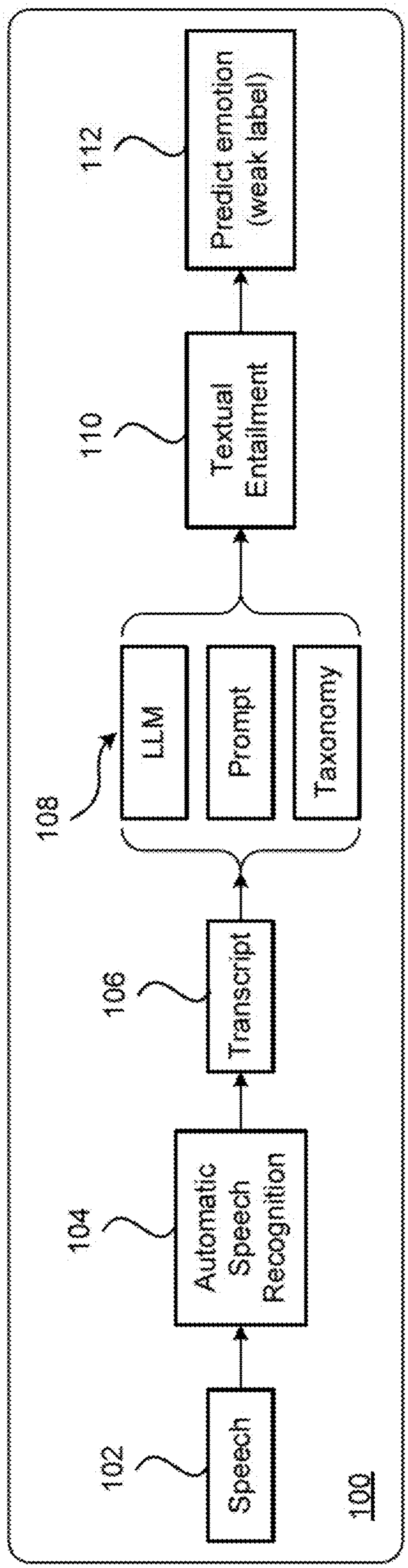
FIGS. 1A-C illustrate example approaches for training and fine-tuning/inference in accordance with aspects of the technology.
Figure 1B:
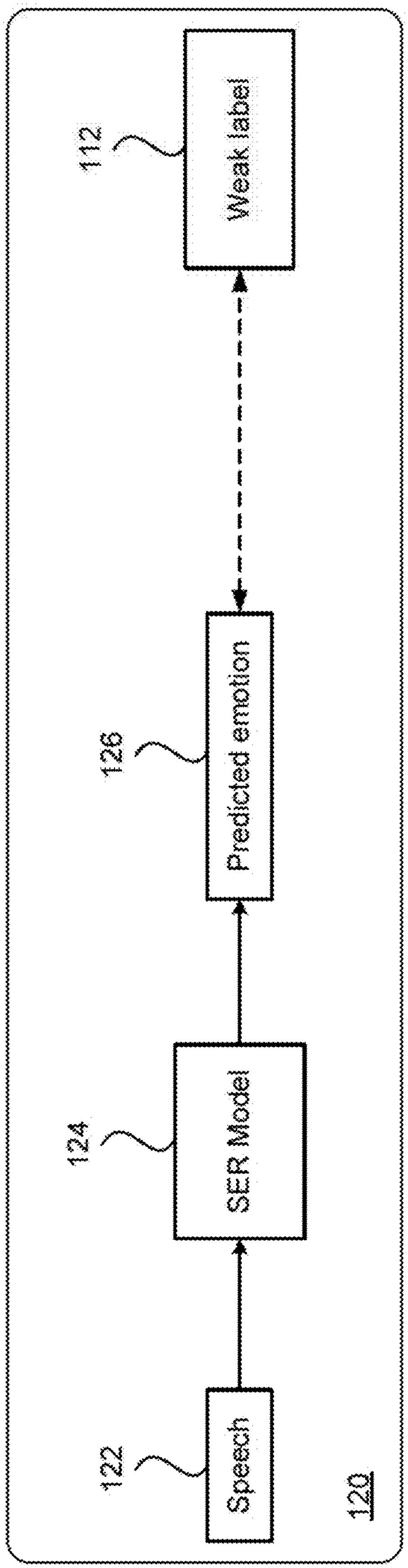

FIGS. 1A-B illustrate examples of SER model training, where FIG. 1A shows weak label generation, and FIG. 1B shows weakly-supervised learning based on the weak label generation. Example 100 of FIG. 1A starts with input speech 102 (e.g., a snippet of an audio file), which may be from a variety of audio sources. The input speech 102 is applied to an automatic speech recognition (ASR) module 104, which is configured to convert the speech to text. The ASR module 104 outputs a transcript 106 that corresponds to the speech. The transcript is applied to a pre-trained LLM according to an engineered prompt and a predetermined taxonomy, as shown at 108. The result of this stage is to extract weak emotion labels in predetermined taxonomy via textual entailment, as shown at 110. Then at block 112 the system generates a predicted emotion or "weak label".

In one scenario, the input speech has a high degree of expressive content. For example, models may be pre-trained on dramatic clips from movies, shows and the like that have at least a threshold amount of expression. It has been found that speech coming from non-expressive content (like meetings, townhalls, etc.) may be less useful for pre-training. In another scenario, synthetic speech could be employed for training in place of or to supplement natural human speech. Here, synthesized speech should be expressive and natural, and may be used to augment an already existing non-synthetic dataset. In addition, the word length/limit of the transcript can be determined by the maximum token length that is allowed to be applied to the pre-trained LLM. However, a long sentence could be segmented into smaller semantically meaningful portions to overcome such a limitation.

Example 120 of FIG. 1B shows how the weak label is used for weakly-supervised learning to pre-train a SER model. A snippet of speech 122 (which is the same snippet as in input speech 102), e.g., from a speech corpus or other database, is input to SER model 124, which generates a predicted emotion 126. This is compared against the weak label 112. When making the comparison, the system may use a sigmoid cross-entropy loss. In this case, for each emotion in a taxonomy the model would output a probability between 0 to 1 that the emotion is present in the speech. This set of probabilities is then compared to the weak label, and is penalized according to a cross-entropy loss function.

Figure 1C:
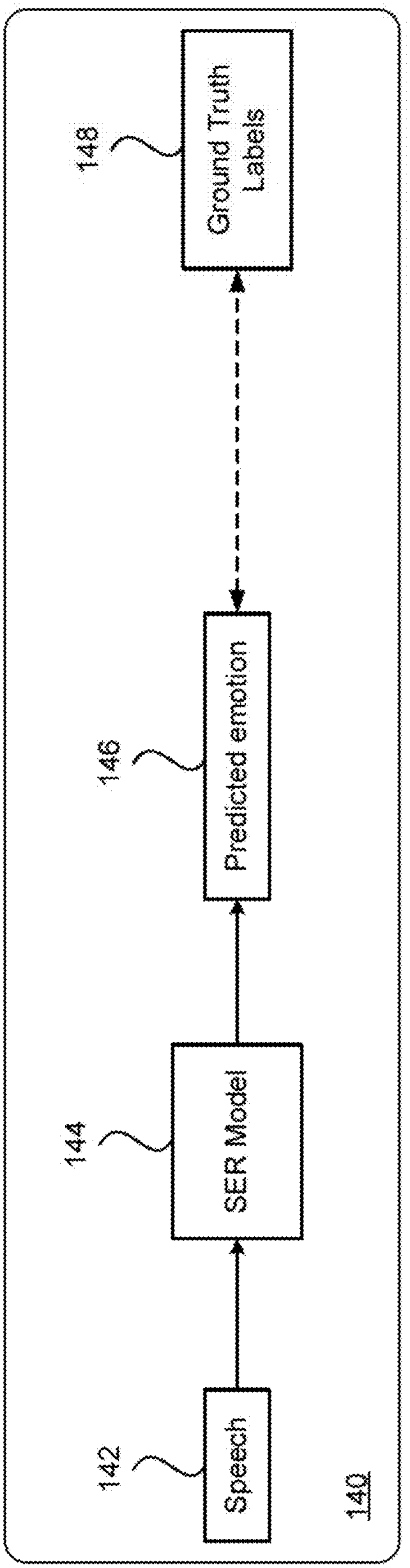

Example 140 of FIG. 1C illustrates fine tuning or inference, in which obtained speech 142 is applied to SER model 144, which generates predicted emotion 146. Here, the predicted emotion 146 is compared against one or more ground truth labels 148.

Language may be one of the relevant factors that informs the choice of the pre-trained LLM used for weak label inference. The LLM chosen must have the ability to process language or languages present in the audio. Dialect and accent may be harder to account for in textual entailment, as the system would need to account for the socio-cultural context and any downstream pre-trained LLM chosen need to be able to distinguish between different socio-cultural contexts. One way to overcome this is by engineering prompts or choosing pre-trained LLMs that incorporate socio-cultural context (geographical regions or demographics for example) into how they are developed. ASR is another system that is certainly affected by language, dialect and accent. The approach can overcome these issues by ensuring that ASR systems are developed and proficient for the language and related context in which the proposed model is deployed.

The ground truth labels 148 may come from human raters who listen to a speech utterance and make a judgement on the emotions they perceive in the speech. Multiple raters can be employed on each utterance, which enables building a probability distribution over possible responses. The nature of these ground truth labels may dictate how the model's output is compared against the ground truth. In the case of a single response, just like the weak labels, a cross-entropy loss is appropriate. Probability distributions over emotions can also be handled with a cross-entropy loss or softmax technique, or treated as a regression problem (e.g., mean squared error, etc.).

Testing has demonstrated that the described approach can noticeably improve SER performance and label efficiency by fine-tuning on benchmark datasets. Moreover, it is shown that despite the emotion labels being derived from speech content only, the (LanSER) approach captures speech prosody information that is relevant to SER.

The LLM and SER models may be implemented by various types of neural networks. By way of example only, the approaches discussed herein may be applied with different types of machine learning architectures, including Transformer-type architectures, Convolutional Neural Network (CNN)-type architectures, Deep Neural Network (DNN)-type architectures, sequence models such as recurrent neural network (RNN)-type architectures, etc.

The following begins with a discussion of a general Transformer architecture, followed by a detailed discussion of the speech emotion recognition framework and implementation according to aspects of the technology.

General Transformer Approach

Figure 2:
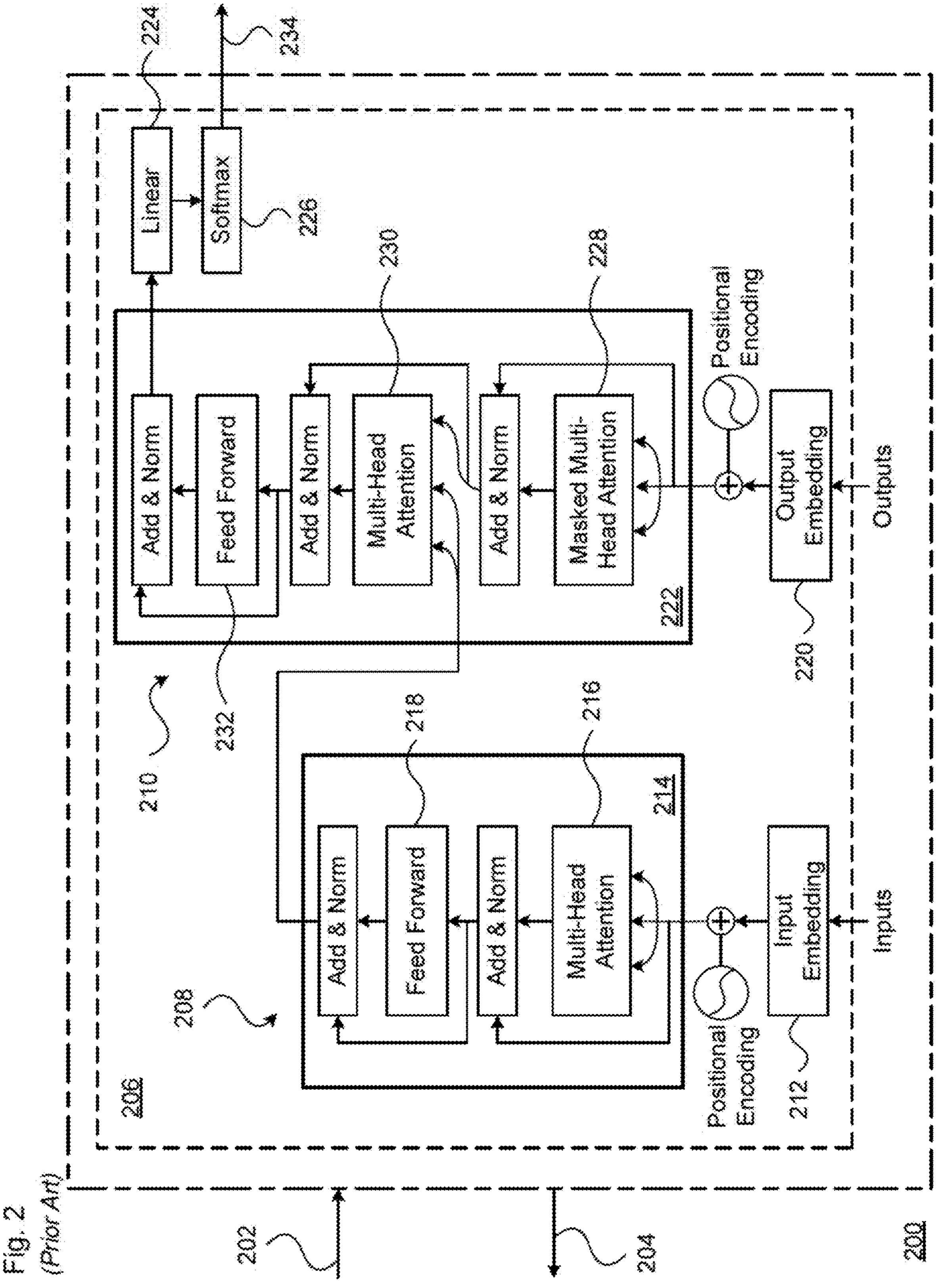
Fig. 2 (Prior Art)
FIG. 2 illustrates a general transformer architecture for use with aspects of the technology.

The techniques discussed herein may employ a self-attention architecture, e.g., the Transformer neural network encoder-decoder architecture. An exemplary general Transformer-type architecture is shown in FIG. 2, which is based on the arrangement shown in U.S. Pat. No. 10,452,978, entitled "Attention-based sequence transduction neural networks", the entire disclosure of which is incorporated herein by reference.

System 200 of FIG. 2 is implementable as computer programs by processors of one or more computers in one or more locations. The system 200 receives an input sequence 202 and processes the input sequence 202 to transduce the input sequence 202 into an output sequence 204. The input sequence 202 has a respective network input at each of multiple input positions in an input order and the output sequence 204 has a respective network output at each of multiple output positions in an output order.

System 200 can perform any of a variety of tasks that require processing sequential inputs to generate sequential outputs. System 200 includes an attention-based sequence transduction neural network 206, which in turn includes an encoder neural network 208 and a decoder neural network 210. The encoder neural network 208 is configured to receive the input sequence 202 and generate a respective encoded representation of each of the network inputs in the input sequence. An encoded representation is a vector or other ordered collection of numeric values. The decoder neural network 210 is then configured to use the encoded representations of the network inputs to generate the output sequence 204. Generally, both the encoder 208 and the decoder 210 are attention-based. In some cases, neither the encoder nor the decoder includes any convolutional layers or any recurrent layers. The encoder neural network 208 includes an embedding layer (input embedding) 212 and a sequence of one or more encoder subnetworks 214. The encoder neural 208 network may N encoder subnetworks 214.

The embedding layer 212 is configured, for each network input in the input sequence, to map the network input to a numeric representation of the network input in an embedding space, e.g., into a vector in the embedding space. The embedding layer 212 then provides the numeric representations of the network inputs to the first subnetwork in the sequence of encoder subnetworks 214. The embedding layer 212 may be configured to map each network input to an embedded representation of the network input and then combine, e.g., sum or average, the embedded representation of the network input with a positional embedding of the input position of the network input in the input order to generate a combined embedded representation of the network input. In some cases, the positional embeddings are learned. As used herein, "learned" means that an operation or a value has been adjusted during the training of the sequence transduction neural network 206. In other cases, the positional embeddings may be fixed and are different for each position.

The combined embedded representation is then used as the numeric representation of the network input. Each of the encoder subnetworks 214 is configured to receive a respective encoder subnetwork input for each of the plurality of input positions and to generate a respective subnetwork output for each of the plurality of input positions. The encoder subnetwork outputs generated by the last encoder subnetwork in the sequence are then used as the encoded representations of the network inputs. For the first encoder subnetwork in the sequence, the encoder subnetwork input is the numeric representations generated by the embedding layer 212, and, for each encoder subnetwork other than the first encoder subnetwork in the sequence, the encoder subnetwork input is the encoder subnetwork output of the preceding encoder subnetwork in the sequence.

Each encoder subnetwork 214 includes an encoder self-attention sub-layer 216. The encoder self-attention sub-layer 216 is configured to receive the subnetwork input for each of the plurality of input positions and, for each particular input position in the input order, apply an attention mechanism over the encoder subnetwork inputs at the input positions using one or more queries derived from the encoder subnetwork input at the particular input position to generate a respective output for the particular input position. In some cases, the attention mechanism is a multi-head attention mechanism as shown. In some implementations, each of the encoder subnetworks 214 may also include a residual connection layer that combines the outputs of the encoder self-attention sub-layer with the inputs to the encoder self-attention sub-layer to generate an encoder self-attention residual output and a layer normalization layer that applies layer normalization to the encoder self-attention residual output. These two layers are collectively referred to as an "Add & Norm" operation in FIG. 2.

Some or all of the encoder subnetworks can also include a position-wise feed-forward layer 218 that is configured to operate on each position in the input sequence separately. In particular, for each input position, the feed-forward layer 218 is configured to receive an input at the input position and apply a sequence of transformations to the input at the input position to generate an output for the input position. The inputs received by the position-wise feed-forward layer 218 can be the outputs of the layer normalization layer when the residual and layer normalization layers are included or the outputs of the encoder self-attention sub-layer 216 when the residual and layer normalization layers are not included. The transformations applied by layer 218 will generally be the same for each input position (but different feed-forward layers in different subnetworks may apply different transformations).

In cases where an encoder subnetwork 214 includes a position-wise feed-forward layer 218 as shown, the encoder subnetwork can also include a residual connection layer that combines the outputs of the position-wise feed-forward layer with the inputs to the position-wise feed-forward layer to generate an encoder position-wise residual output and a layer normalization layer that applies layer normalization to the encoder position-wise residual output. As noted above, these two layers are also collectively referred to as an "Add & Norm" operation. The outputs of this layer normalization layer can then be used as the outputs of the encoder subnetwork 214.

Once the encoder neural network 208 has generated the encoded representations, the decoder neural network 210 is configured to generate the output sequence in an auto-regressive manner. That is, the decoder neural network 210 generates the output sequence, by at each of a plurality of generation time steps, generating a network output for a corresponding output position conditioned on (i) the encoded representations and (ii) network outputs at output positions preceding the output position in the output order. In particular, for a given output position, the decoder neural network generates an output that defines a probability distribution over possible network outputs at the given output position. The decoder neural network can then select a network output for the output position by sampling from the probability distribution or by selecting the network output with the highest probability.

Because the decoder neural network 210 is auto-regressive, at each generation time step, the decoder network 210 operates on the network outputs that have already been generated before the generation time step, i.e., the network outputs at output positions preceding the corresponding output position in the output order. In some implementations, to ensure this is the case during both inference and training, at each generation time step the decoder neural network 210 shifts the already generated network outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 210 operate on data at output positions preceding the given output positions (and not on data at any other output positions), it will be understood that this type of conditioning can be effectively implemented using shifting.

The decoder neural network 210 includes an embedding layer (output embedding) 220, a sequence of decoder subnetworks 222, a linear layer 224, and a softmax layer 226. In particular, the decoder neural network can include N decoder subnetworks 222. However, while the example of FIG. 2 shows the encoder 208 and the decoder 210 including the same number of subnetworks, in some cases the encoder 208 and the decoder 210 include different numbers of subnetworks. The embedding layer 220 is configured to, at each generation time step, for each network output at an output position that precedes the current output position in the output order, map the network output to a numeric representation of the network output in the embedding space. The embedding layer 220) then provides the numeric representations of the network outputs to the first subnetwork 222 in the sequence of decoder subnetworks.

In some implementations, the embedding layer 220 is configured to map each network output to an embedded representation of the network output and combine the embedded representation of the network output with a positional embedding of the output position of the network output in the output order to generate a combined embedded representation of the network output. The combined embedded representation is then used as the numeric representation of the network output. The embedding layer 220 generates the combined embedded representation in the same manner as described above with reference to the embedding layer 212.

Each decoder subnetwork 222 is configured to, at each generation time step, receive a respective decoder subnetwork input for each of the plurality of output positions preceding the corresponding output position and to generate a respective decoder subnetwork output for each of the plurality of output positions preceding the corresponding output position (or equivalently, when the output sequence has been shifted right, each network output at a position up to and including the current output position). In particular, each decoder subnetwork 222 includes two different attention sub-layers: a decoder self-attention sub-layer 228 and an encoder-decoder attention sub-layer 230. Each decoder self-attention sub-layer 228 is configured to, at each generation time step, receive an input for each output position preceding the corresponding output position and, for each of the particular output positions, apply an attention mechanism over the inputs at the output positions preceding the corresponding position using one or more queries derived from the input at the particular output position to generate an updated representation for the particular output position. That is, the decoder self-attention sub-layer 228 applies an attention mechanism that is masked so that it does not attend over or otherwise process any data that is not at a position preceding the current output position in the output sequence.

Each encoder-decoder attention sub-layer 230, on the other hand, is configured to, at each generation time step, receive an input for each output position preceding the corresponding output position and, for each of the output positions, apply an attention mechanism over the encoded representations at the input positions using one or more queries derived from the input for the output position to generate an updated representation for the output position. Thus, the encoder-decoder attention sub-layer 230 applies attention over encoded representations while the decoder self-attention sub-layer 228 applies attention over inputs at output positions.

In the example of FIG. 2, the decoder self-attention sub-layer 228 is shown as being before the encoder-decoder attention sub-layer in the processing order within the decoder subnetwork 222. In other examples, however, the decoder self-attention sub-layer 228 may be after the encoder-decoder attention sub-layer 230 in the processing order within the decoder subnetwork 222 or different subnetworks may have different processing orders. In some implementations, each decoder subnetwork 222 includes, after the decoder self-attention sub-layer 228, after the encoder-decoder attention sub-layer 230, or after each of the two sub-layers, a residual connection layer that combines the outputs of the attention sub-layer with the inputs to the attention sub-layer to generate a residual output and a layer normalization layer that applies layer normalization to the residual output. These two layers being inserted after each of the two sub-layers, both referred to as an “Add & Norm” operation.

Some or all of the decoder subnetwork 222 also include a position-wise feed-forward layer 232 that is configured to operate in a similar manner as the position-wise feed-forward layer 218 from the encoder 208. In particular, the layer 232 is configured to, at each generation time step: for each output position preceding the corresponding output position: receive an input at the output position, and apply a sequence of transformations to the input at the output position to generate an output for the output position. The inputs received by the position-wise feed-forward layer 232 can be the outputs of the layer normalization layer (following the last attention sub-layer in the subnetwork 222) when the residual and layer normalization layers are included or the outputs of the last attention sub-layer in the subnetwork 222 when the residual and layer normalization layers are not included. In cases where a decoder subnetwork 222 includes a position-wise feed-forward layer 232, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an “Add & Norm” operation. The outputs of this layer normalization layer can then be used as the outputs of the decoder subnetwork 222.

At each generation time step, the linear layer 224 applies a learned linear transformation to the output of the last decoder subnetwork 222 in order to project the output of the last decoder subnetwork 222 into the appropriate space for processing by the softmax layer 226. The softmax layer 226 then applies a softmax function over the outputs of the linear layer 224 to generate the probability distribution (output probabilities) 234 over the possible network outputs at the generation time step. The decoder 210 can then select a network output from the possible network outputs using the probability distribution.

Language-Model Supported Speech Emotion Recognition Methodology

The SER methodology discussed herein avoids finetuning LLMs on task-specific datasets by inferring weak labels via textual entailment, enabling exploration with wider emotion taxonomies. Pre-training on large human-annotated emotion datasets is unnecessary in this methodology. Moreover, the methodology is complementary to self-supervised learning, since both approaches can be combined for training SER models.

FIGS. 1A-C, discussed above, provide an overview of the training and inference process. During pre-training, the system uses ASR to generate transcripts from speech utterances, which are fed into a LLM with appropriate prompt to extract weak emotion labels in predetermined taxonomy via textual entailment (FIG. 1A). These labels are used to pre-train a SER model via weakly-supervised learning (FIG. 1B). The pre-trained SER model can then either be used directly to output emotion predictions according to the emotion taxonomy used to extract weak labels, or can be adapted for a different taxonomy or dataset by fine-tuning (FIG. 1C). Note that the emotions inferred using LLMs from speech content are proxies for the emotion being expressed, and may not capture the larger context or intent of the speaker. Thus, they are treated as "weak" emotion labels (112 in FIGS. 1A and 1B).

In some scenarios, the employed LLMs have been trained via a token masking approach on web-scale data. Generally speaking, an LLM should provide more useful output if it were either fine-tuned on emotional text or if emotion queries were included in the entailment tuning process. In addition, application of the engineered prompt and the taxonomy to the LLM are model architecture agnostic. The prompt can be applied by pre-pending it to the text supplied to the LLM. The taxonomy is used during the entailment inference step.

There are multiple ways to use LLMs for extracting weak emotion labels. Text generation and filling mask are two typical approaches. FIGS. 3A-B demonstrates the behaviors of text generation and filling mask, respectively, for weak emotion label prediction. During testing (described further below), representative LLMs were used for each approach, in particular GPT-2 for text generation and BERT for filling mask. Details regarding GPT-2 may be found, by way of example only, in "Language models are unsupervised multitask learners," by Radford et al., 2019, while details regarding BERT may be found, by way of example only, in "BERT: Pretraining of deep bidirectional transformers for language understanding." by Devlin et al., June 2019, in NAACL, the disclosures of which are incorporated herein by reference. While these approaches show some success, the common limitation in a zero-shot setting is that they often output undesirable "noise", like irrelevant words (text generation), or non-emotional responses (e.g., "himself" in filling mask as shown in FIG. 3B).

In view of this, according to an aspect of the technology, it is desirable to constrain the LLM model to output only words relevant to emotion perception. To this end, textual entailment is used to generate weak labels that also allows us to constrain the emotion taxonomy a priori. An exemplary discussion of textual entailment is provided in "Benchmarking zero-shot text classification: Datasets, evaluation and entailment approach," by Wenpeng et al., in EMNLP, 2019, which is incorporated herein by reference.

This process may be constrained according to the type of application/use of the technology. According to one scenario, the taxonomy is chosen depending on the application of the technology, such as the type of app or product with which it will be used. Here, the entailment prompt and taxonomy chosen would depend on the classification task. By way of example only, if applied to an in-home thermostat, there may be a set of specific words or phrases (e.g., "I'm warm", "Chilly", "Brrr" or "It's so cozy") that can indicate whether the system should adjust the temperature. For such an example, the taxonomy may be picked so that it would enable the action (e.g., increase temperature, reduce temperature, etc.). The words/phrases can then be fed into a textual entailment system and asked which of the concepts in the taxonomy is the most likely action. One example may involve classifying the room type (such as dining room, bedroom, living room, kitchen, office, rec room, etc.) based on the conversations or descriptions of that room. In this case, the taxonomy may be picked a priori to limit the options to most likely places in a house, apartment or other dwelling.

Figure 3C:
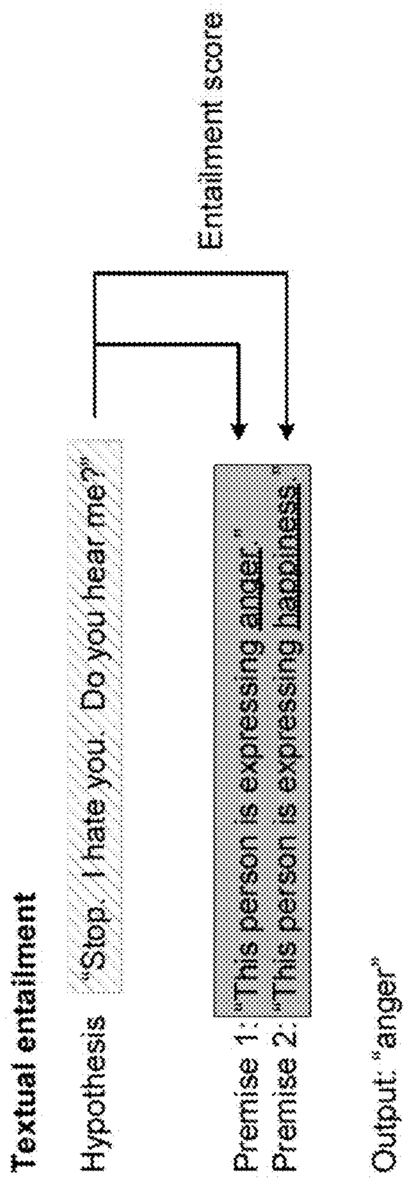

FIG. 3C illustrates an example of entailment-based weak emotion label generation. At a high-level, this method calculates the entailment scores between an input transcript (called a "hypothesis") and prompts with candidate labels from the taxonomy (called a "premise"), and then selects the item with the highest score as the weak label. Formally, let $x \in \chi$ denote ASR transcripts from speech and $y \in \mathcal{Y}$ denote a candidate label in taxonomy $\mathcal{Y}$. A prompting function $g(\cdot)$ prepends a predefined prompt to the given input. $f(x,g(y))$ denotes the entailment score between a hypothesis x and a prompted label g(y). The resulting week emotion label $\hat{y}$ for a given transcript x can be calculated as:

$$\hat{y} := \underset{y \in \mathcal{Y}}{\arg\max}\, f(x, g(y)).$$

The entailment scoring function $f$ is a function typically parameterized by a neural network and fine-tuned on the entailment task. By way of example, ROBERTa may be fine-tuned on the Multi-genre Natural Language Inference (MNLI) dataset. ROBERTa is described, for instance, by Liu et all in "Roberta: A robustly optimized BERT pretraining approach," CoRR, vol. abs/1907.11692, 2019, while the MNLI dataset is described in "A broad-coverage challenge corpus for sentence understanding through inference," by Williams et al., in NAACL. Association for Computational Linguistics, 2018, pp. 1112-1122, which are incorporated herein by reference. The MNLI dataset is composed of hypothesis and premise pairs for diverse genres, which is specialized for the textual entailment approach, and do not explicitly focus on emotion-related concepts.

As described above with regard to FIG. 1A, the speech transcript is fed to an LLM, which runs according to an engineered prompt and a predetermined taxonomy. The most effective prompt may vary for different models.

Prompt engineering is a task-specific description embedded in inputs to LLMs (e.g., a question format). It is an important component affecting zero-shot performance of LLMs on various downstream tasks. As shown below regarding testing, various prompts were evaluated in order to understand the impact of prompt engineering for the entailment task. Ultimately, it was found that a prompt such as "The emotion of the conversation is { }." performed most effectively, and that prompt was used throughout testing.

The choice of emotion taxonomy is important in developing SER models as emotion perception and expression are nuanced. Common SER benchmarks typically use 4-6 emotion categories, which it has been found do not capture the variability in emotion perception. In contrast, fine-grained taxonomies may be used to help learn effective representations by using the high degree of the expressiveness of LLMs. Thus, during testing BRAVE-43, a fine-grained taxonomy, was evaluated. This taxonomy is discussed by Cowen et al. in "How emotion is experienced and expressed in multiple cultures: a large-scale experiment," June 2021, which is incorporated herein by reference. In one scenario, the BRAVE taxonomy, which originally contained 42 self-reported emotions labels, was modified by converting several two-word emotions to one-word emotions for simplicity and adding "shock" to capture a negative version of "surprise", resulting in a total of 43 categories. Note this taxonomy is not speech-specific. The impact of taxonomy selection is discussed further below.

Testing and Evaluation

Given a sufficiently large amount of data, pre-training speech-only models on weak emotion labels derived from text may improve performance on SER tasks. Testing was conducted to show this technical benefit of the technology.

Testing investigated two large-scale speech datasets for system (LanSER) pre-training: People's Speech and Condensed Movies. People's Speech is described, for instance, by Galvez et al. in "The people's speech: A large-scale diverse English speech recognition dataset for commercial usage," in Thirty-fifth Conference on Neural Information Processing Systems Datasets and Benchmarks Track (Round 1), 2021, while Condensed Movies is described, for instance, by Bain et al. in "Condensed movies: Story Based retrieval with contextual embeddings", 2020, the disclosures of which are incorporated herein by reference.

People's Speech is a very large English speech recognition corpus, containing approximately 30K hours of general speech. Condensed Movies is comprised of about 1,000 hours of video clips from 3,000 movies. For testing only the audio was used. These two large-scale speech datasets were explored to understand the impact of the amount of data and their distributions. For instance, while People's Speech had more samples from less emotional data sources (e.g., government, interview; health, etc.), Condensed Movies had fewer samples from a more emotional data source (movies). Whisper ASR ("small" variant) (described by Radford et al. in "Robust speech recognition via large-scale weak supervision," Tech. Rep., Technical report, OpenAI, Tech. Rep., 2022, incorporated herein by reference) was used to segment and generate transcripts for People's Speech and Condensed Movies datasets, which resulted in U.S. Pat. Nos. 4,321,002 and 1,030,711 utterances, respectively.

Regarding downstream tasks, two common SER benchmarks were used in the evaluation process: IEMOCAP (described by Busso et al. in "Iemocap: Interactive emotional dyadic motion capture database." Language resources and evaluation, vol. 42, no. 4, pp. 335-359, 2008) and CREMA-D (described by Cooper et al. in "Crema-d: Crowd-sourced emotional multimodal actors dataset," IEEE Transactions on Affective Computing, vol. 5, no. 4, pp. 377-390, 2014), which are incorporated herein by reference. IEMOCAP is an acted, multi-speaker database containing approximately 5,531 audio clips from 12 hours of speech. Testing followed a four-class (anger, happiness, sadness, and neutral) setup. CREMA-D has approximately 7,441 audio clips collected from 91 actors. An important characteristic of CREMA-D is that it is linguistically constrained, having only 12 sentences each presented using six different emotions (anger, disgust, fear, happy, neutral, and sad). CREMA-D was used to validate that the models indeed learned prosodic representations, and did not just learn to use language to predict the emotional expression.

The current (LanSER) approach was compared with the following four baselines: Majority, GT Transcript+Word2Vec, GT Transcript+Entailment, and Supervised. Examples of the first and third baselines are discussed in the article "Benchmarking zero-shot text classification: Datasets, evaluation and entailment approach," mentioned above. An example of the second baseline is provided in "Distributed representations of words and phrases and their compositionality," by Sutskever et al., in Proceedings of the 26th International Conference on Neural Information Processing Systems-Volume 2, ser. NIPS 13. Red Hook, NY, USA: Curran Associates Inc., 2013, p. 3111-3119, which is incorporated herein by reference.

The Majority baseline output the most prevalent class. For GT Transcript+Word2Vec, each word in a ground-truth (GT) transcript was converted to a Word2Vec embedding. That approach then computes the cosine similarity between the averaged embedding of the transcript and each class label, and predicts the class with the highest similarity. For GT Transcript+Entailment, the prediction is made from the entailment method with GT transcripts. And the Supervised baseline is traditional supervised learning with the same configuration as that of the LanSER approach, except without pre-training.

Two language-based methods (Word2Vec and Entailment) were included to better understand how the LanSER approach compared with models using lexical content alone. Note that the language baselines assume GT transcripts are available. In practice, these baselines would require an ASR pipeline to get transcripts, which may involve additional computational and developmental cost. Additionally, the Supervised audio-based baseline was included to evaluate how effective LanSER is in utilizing limited labeled data.

Mel-spectrogram features (frame length 32 ms, frame steps 25 ms, 50) bins from 60-3600 Hz) were extracted from the audio waveforms as input to the model and used ResNet-50 (see "Deep residual learning for image recognition," by He et al., in 2016 IEEE Conference on Computer Vision and Pattern Recognition (CVPR), Los Alamitos, CA, USA: IEEE Computer Society, June 2016, pp. 770-778, which is incorporated herein by reference) as the backbone network for training. For both pre-training and fine-tuning, the cross-entropy loss was minimized with the Adam optimizer (described, by example, by Kingma et al. in "Adam: A method for stochastic optimization," in International Conference on Learning Representations (ICLR), 2015) and implemented in TensorFlow (see Abadi et al., "TensorFlow: Large-scale machine learning on heterogeneous systems," 2015), which are incorporated herein by reference.

For pre-training, a warm-up learning rate schedule was adopted where the rate warmed up for the initial 5% of updates to a peak of $5\times10^{-4}$ and then linearly decayed to zero. A batch size of 256 was used and trained for 100K iterations. For fine-tuning on the downstream tasks, the pretrained weights were loaded and used a fixed learning rate of 10-4. The batch size was set as 64 and then trained for 10K iterations. The downstream datasets were split into a 6:2:2 (train:valid:test) ratio, and the best model was selected on the validation set for testing.

Prompt Engineering

The impact of various prompts was investigated to infer weak emotion labels using IEMOCAP. IEMOCAP was chosen because it has transcripts and human-rated labels with majority agreement referred here as "ground-truth". To evaluate the prompts, accuracy was computed by comparing the weak labels with the ground-truth. The evaluation also examined prompts used in different emotion recognition studies and modified a few vision-specific prompts for study by replacing words such as "photo" or "image" with "speech".

Table 1 in FIG. 4 shows various prompts that were evaluated, along with the accuracy for each prompt. Note that { } indicates the masked position. It can be seen that the prompt ("I am { }.)" was not as effective at capturing emotional signals as most of the other prompts. Similarly, adapting vision-specific prompts was ineffective. This indicates that it is beneficial to tailor the prompt to the SER task. Among the prompts we explored, "The emotion of the conversation is { }." had the highest accuracy. This prompt was then adopted to infer weak labels in the experiments. The prompts for SER task can be tailored based on the aspect of emotion signal to be labeled. For example, instead of "Emotion of the conversation is { }", alternatives may be: "The tone of this utterance is { }" or "The tone of this conversation is { }".

Fine Tuning

For the testing, all models were fine-tuned on the downstream tasks to evaluate their label efficiency and performance. To measure label efficiency, the percentage of seen training data was varied from 10%. to 100% for each dataset. Table 2 in FIG. 5 shows the results, where the percentages were varied between 10%, 30%, 50%, 70% and 100%. The bolded results indicate the highest accuracy. Note that "LanSER (People's Speech)" means pre-training with Peoples Speech, while "LanSER (Condensed Movies)" refers to pre-training with Condensed Movies. In all cases, the BRAVE taxonomy was used as the label space. The results are discussed as follows.

First, natural language processing (NLP) baselines (Word2Vec and Entailment) failed on CREMA-D, as they only use lexical speech content. Interestingly, LanSER's results on CREMA-D indicate that the model can learn prosodic representations via weak supervision from LLMs. This result is attributed to pre-training with large-scale data, and it indicates that speech and text emotions are correlated enough that SER models can learn to use prosodic features even with labels from text only given a sufficiently large amount of data.

Overall, the LanSER approach outperformed the NLP and majority class baselines. Notably, LanSER pre-trained with the Condensed Movies showed more improved accuracy than with the People's Speech. While People's Speech is comprised of fairly neutral speech data (e.g., government, interviews, etc.), Condensed Movies is comprised of movies having more expressive speech. Thus, from the emotion recognition perspective, Peoples Speech may introduce more noise than Condensed Movies.

To assess that performance improvements are being driven by the emotion labels inferred using LLMs, and not just the scale of the pre-training data, the evaluation compared the fine-tuning performance of LanSER to a model pre-trained on Condensed Movies using random uniformly sampled labels. As shown in Table 3 of FIG. 6, models pre-trained with weak labels outperformed ones trained with random labels, further indicating that the weak emotion labels inferred using LLMs are meaningful.

Zero-Shot Classification Accuracy

A unique advantage of the LanSER approach discussed herein over self-supervised learning is that it enables SER models to support zero-shot classification. Table 4 of FIG. 7 shows the zero-shot classification accuracy. For LanSER, SER models were pre-trained with the taxonomy of the downstream dataset instead of BRAVE and evaluated in a zero-shot setting. Models were used with randomly initialized weights and no training as a lower-bound of performance, referred to as "Scratch". Overall, it can be seen that LanSER provides higher accuracy than the baseline in this instance. These results indicate the benefit of training large SER models that can perform well on various downstream tasks, without further fine-tuning. One way to improve zero-shot performance is to use more powerful LLM models that are more likely to yield better weak labels. Another way is to use speech models with higher capacity.

Taxonomy Impact

Figure 8A:
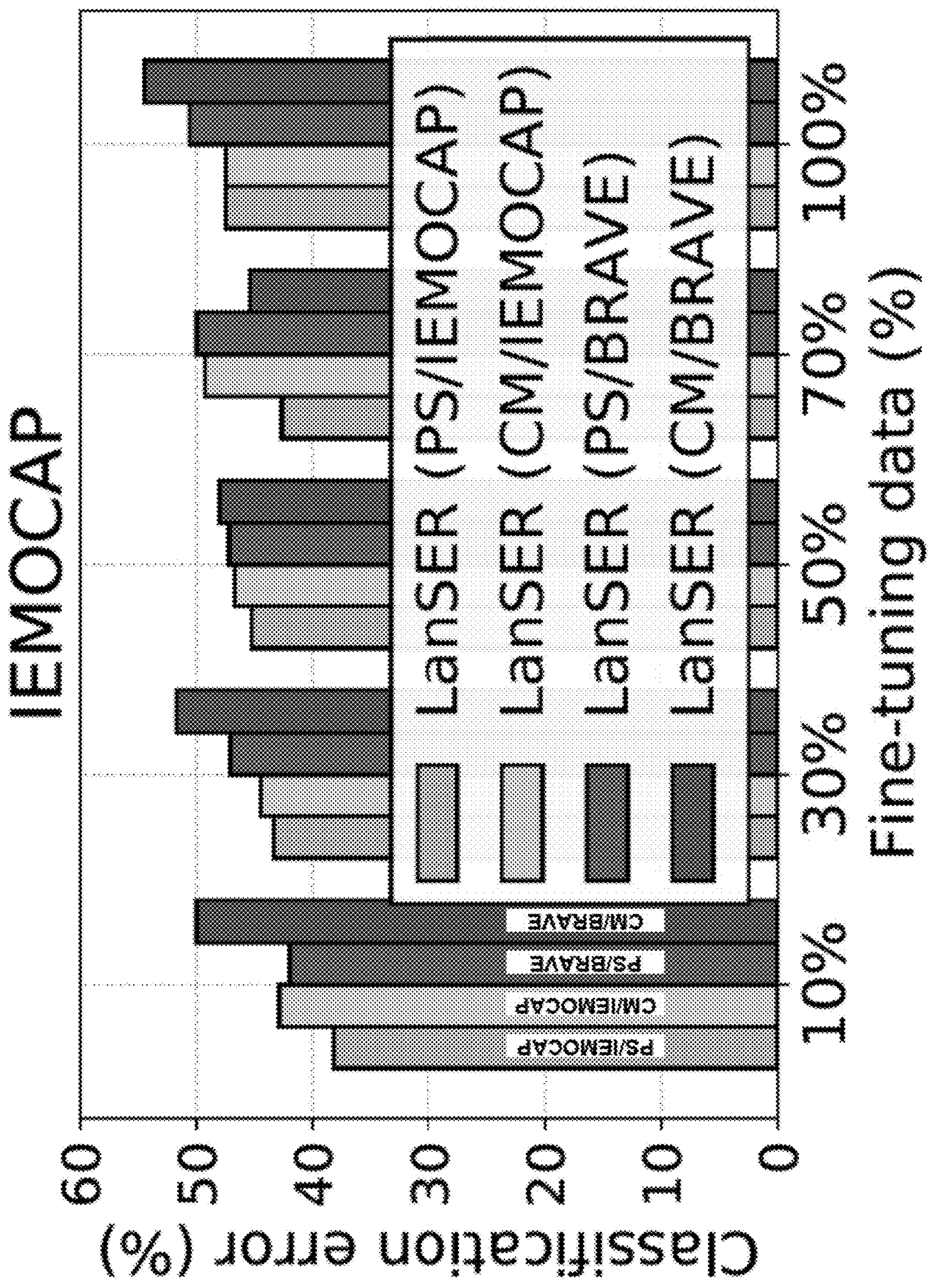
FIGS. 8A and 8B illustrate plots showing the impact of taxonomy selection in accordance with aspects of the technology.
Figure 8B:
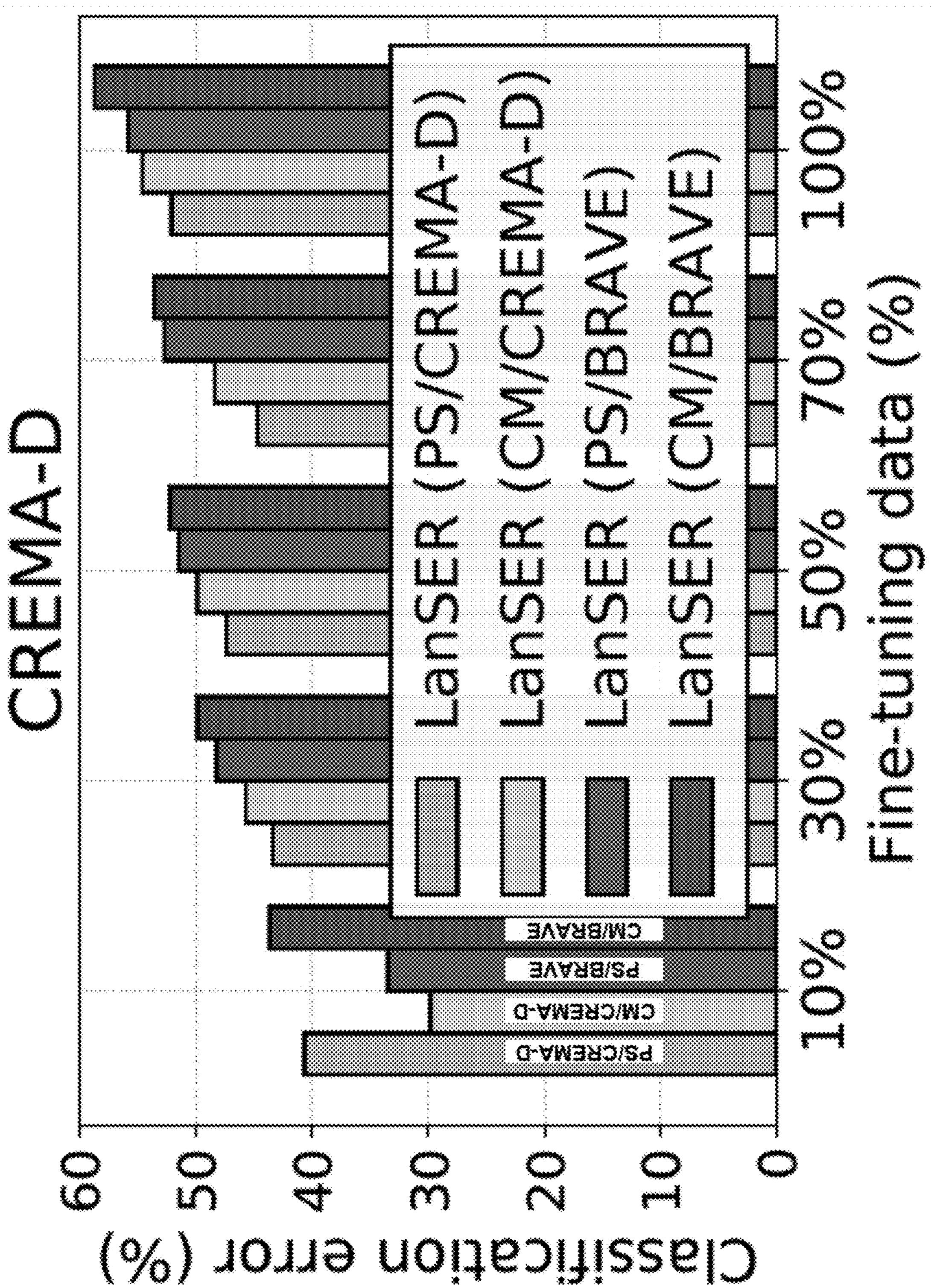

FIGS. 8A-B show the impact of taxonomy selection. Specifically, the BRAVE taxonomy was compared with a downstream task's taxonomies. "PS" and "CM" in the figures refers to People's Speech and Condensed Movies, respectively. "IEMOCAP", "CREMAD", and "BRAVE" mean the taxonomy used to generate weak labels. As shown, pre-training with the finer taxonomy (BRAVE) showed generally better accuracy when fine-tuned, with 4.2% accuracy improvement on average. This indicates that a fine-grained taxonomy is beneficial to learn effective representations by leveraging the high degree of the expressiveness of LLMs.

It is noted that the models discussed herein are not configured to infer the internal emotional state of individuals, but rather model proxies from speech utterances. This is especially true when training on the output of LLMs, since they may not take into account prosody, cultural background, situational or social context, personal history and/or other cues that may be relevant to human emotion perception.

Example Computing Architecture

Figure 9A:
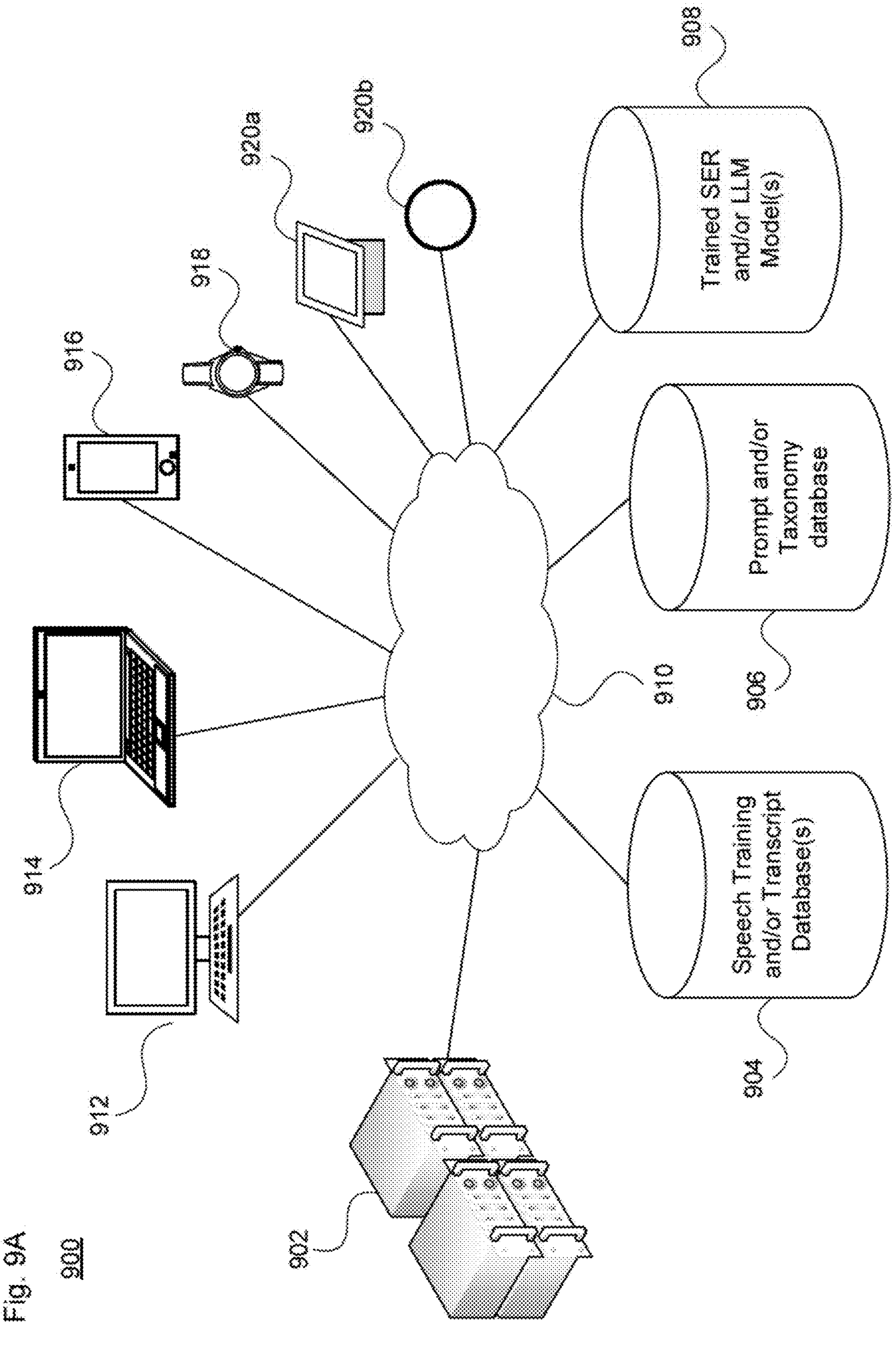
FIGS. 9A-B illustrate a system for use with aspects of the technology.
Figure 9B:
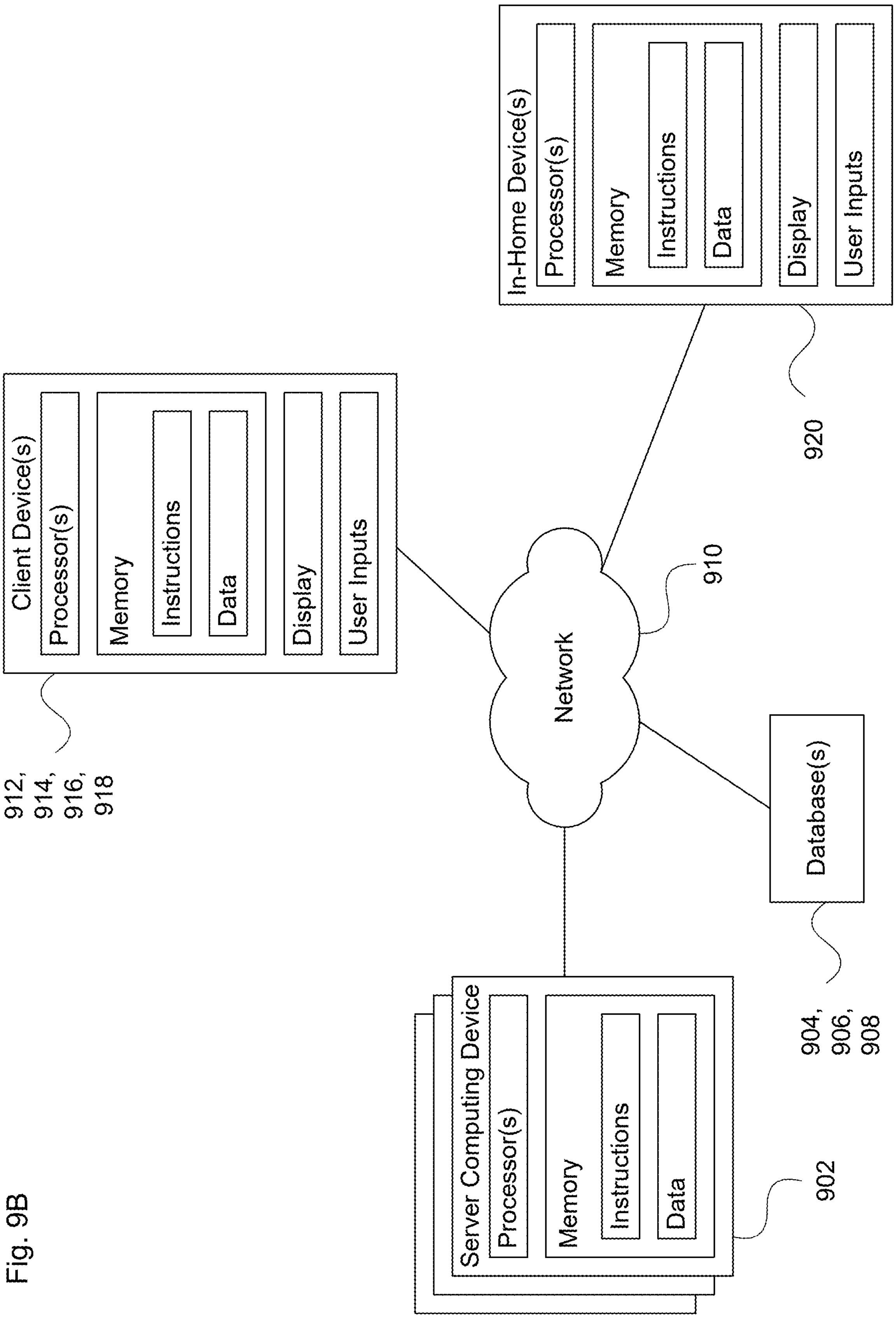

The enhancing speech emotion recognition techniques, in particular the LanSER approaches discussed herein, may be trained on one or more tensor processing units (TPUs), CPUs or other computing in accordance with the features disclosed herein. One example computing architecture is shown in FIGS. 9A and 9B. In particular, FIGS. 9A and 9B are pictorial and functional diagrams, respectively, of an example system 900 that includes a plurality of computing devices and databases connected via a network. For instance, computing device(s) 902 may be implemented as a cloud-based server system. Databases 904, 906 and 908 may store, e.g., training inputs (e.g., speech segments or clips), transcripts derived from speech inputs, prompt and/or taxonomy information, generated weak labels and/or ground truth labels, trained SER and/or LLM models, etc. While three databases are shown, such information may be stored in one or more databases that maintain different types of information. The server system may access the databases via network 910. Client devices may include one or more of a desktop computer 912, a laptop or tablet PC 914, a mobile phone or PDA 916, a wearable device 918 such as a smartwatch or head-mounted display (e.g., a virtual reality headset), in-home devices such as smart display 920*a* and/or a smart home device 920*b* (such as a thermostat or other appliance), etc.

As shown in FIG. 9B, each of the computing devices 902 and 912-920 may include one or more processors, memory, data and instructions. The memory stores information accessible by the one or more processors, including instructions and data (e.g., SER and/or LLM models) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs, TPUs, graphical processing units (GPUs), etc. Alternatively, each processor may be a dedicated device such as an ASIC or other hardware-based processor. Although FIG. 9B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 902. Accordingly, references to a processor or computing device will be understood to include references to a collection of processors or computing devices or memories that may or may not operate in parallel.

The input data, such as speech segments or other audio input, may be operated on by one or more trained LLM models using a selected prompt (e.g., an engineered prompt) and specific taxonomy to generate one or more trained SER models. The client devices may utilize such information in various apps or other programs to perform speech emotion recognition, including speech understanding, quality assessment or other metric analysis, recommendations, classification, search, etc. In one scenario, the SER models may be used to provide a captioning experience that is more expressive to convey how things are said. This could be particularly beneficial for movie or video conference captioning. However, the models may be used in other scenarios to convey the tone of the speech, and thus can be widely applied to situations in which speech emotion recognition can provide helpful context.

The computing devices may include all of the components normally used in connection with a computing device such as the processor and memory described above as well as a user interface subsystem for receiving audio and/or other input from a user and presenting information to the user (e.g., text, imagery, videos and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-related computing devices (e.g., 912-920) may communicate with a back-end computing system (e.g., server 902) via one or more networks, such as network 910. The network 910, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 902 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 902 may include one or more server computing devices that are capable of communicating with any of the computing devices 912-920 via the network 910.

Trained speech emotion recognition models or information or other data derived from the approaches discussed herein may be shared by the server with one or more of the client computing devices. Alternatively or additionally, the client device(s) may maintain their own databases, SER and/or LLM models, etc.

Figure 10:
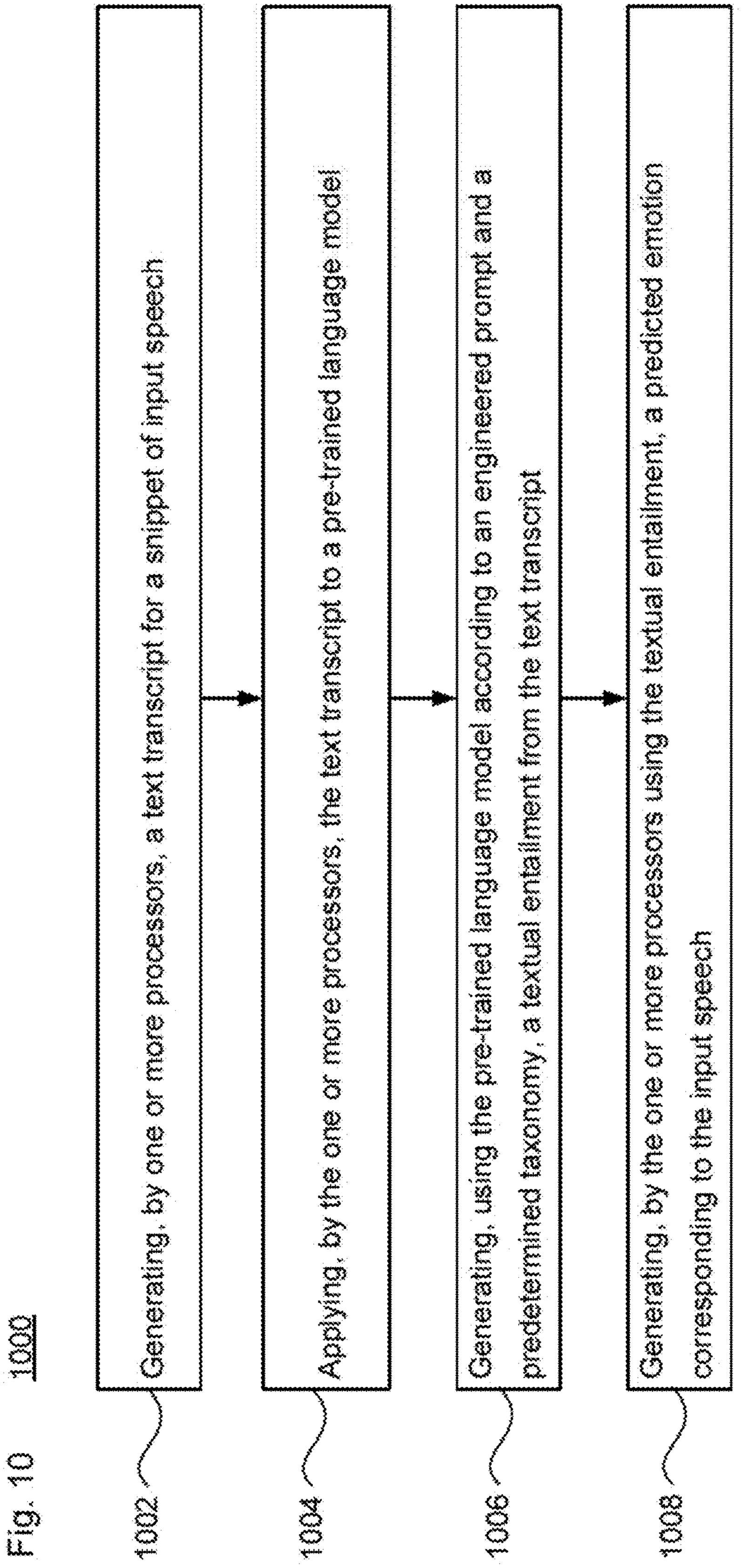
FIG. 10 illustrates an example method in accordance with aspects of the technology.

FIG. 10 illustrates an example flow diagram 1000 for a method in accordance with aspects of the technology. The method includes generating at block 1002, by one or more processors, a text transcript for a snippet of input speech. Then at block 1004, applying, by the one or more processors, the text transcript to a pre-trained language model. Next, at block 1006, the system generates, using the pre-trained language model according to an engineered prompt and a predetermined taxonomy, a textual entailment from the text transcript. And at block 1008 the method includes generating, by the one or more processors using the textual entailment, a predicted emotion corresponding to the input speech.

As noted above, there are a number of technical benefits of the above-described approaches. This includes providing improved label efficiency, as well as effective modeling the prosodic content of speech. Textual entailment provides a technical solution to the speech emotion recognition problem by generating a predicted emotion corresponding to the input speech. The resulting information can be used in different applications to select and provide tailored information to a user, and also to enhance language models. This is beneficial in a number of different types of application, such as a recommendation system that tailors results based on, e.g., a particular emotion, video applications that utilize closed captioning or subtitles, and other apps or services that can use or convey emotion information, such as a texting or chat-type app. The technology is also complementary to self-supervised learning, for instance in a combined approach to train SER models.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for training a speech emotion recognition (SER) model for use with a specific application or product, comprising:

generating, by one or more processors, a text transcript for a snippet of input speech;

applying, by the one or more processors, the text transcript to a pre-trained language model;

generating, using the pre-trained language model according to an engineered prompt and a particular predetermined taxonomy, a textual entailment from the text transcript, wherein the particular predetermined taxonomy (i) is chosen based on the specific application or product with which the SER model is used and (ii) includes a set of words or phrases corresponding to the specific application or product; and generating, by the one or more processors using the textual entailment, a predicted emotion corresponding to the input speech, wherein the predicted emotion is applied as a weak label to train the SER model on the input speech for weakly-supervised learning of the SER model.

2. The method of claim 1, wherein training the SER model includes:

generating an SER predicted emotion using the SER model; and comparing the weak label against the SER predicted emotion.

3. The method of claim 2, wherein the comparing includes evaluating a probability for each emotion in the particular predetermined taxonomy.

4. The method of claim 3, wherein the evaluating is performed according to a cross-entropy loss function.

5. The method of claim 2, further comprising fine-tuning the SER model by evaluating the SER predicted emotion to one or more ground truth labels.

6. The method of claim 1, wherein at least one of the pre-trained language model or the SER model has a transformer architecture.

7. The method of claim 1, wherein the pre-trained language model is trained via token masking.

8. The method of claim 1, wherein the pre-trained language model is constrained to output a set of words that correspond to emotion perception.

9. A system for training a speech emotion recognition (SER) model for use with a specific application or product, comprising:

memory configured to store one or more language models; and one or more processors operatively coupled to the memory, the one or more processors being configure to:

generate a text transcript for a snippet of input speech;

apply the text transcript to a pre-trained language model stored in the memory;

generate, using the pre-trained language model according to an engineered prompt and a particular predetermined taxonomy, a textual entailment from the text transcript, wherein the particular predetermined taxonomy (i) is chosen based on the specific application or product with which the SER model is used and (ii) includes a set of words or phrases corresponding to the specific application or product;

generate, using the textual entailment, a predicted emotion corresponding to the input speech;

apply the predicted emotion as a weak label to train the SER model on the input speech for weakly-supervised learning of the SER model; and store the SER model in the memory.

10. The system of claim 9, wherein training the SER model includes:

generation of an SER predicted emotion using the SER model; and comparison of the weak label against the SER predicted emotion.

11. The system of claim 10, wherein the comparison includes evaluation of a probability for each emotion in the particular predetermined taxonomy.

12. The system of claim 11, wherein the evaluation is performed according to a cross-entropy loss function.

13. The system of claim 10, wherein the one or more processors are further configured to fine-tune the SER model by evaluation of the SER predicted emotion to one or more ground truth labels.

14. The system of claim 9, wherein at least one of the pre-trained language model or the SER model has a transformer architecture.

15. The system of claim 9, wherein the pre-trained language model is trained via token masking.

16. The system of claim 9, wherein the pre-trained language model is constrained to output a set of words that correspond to emotion perception.

17. A non-transitory computer readable storage medium storing one or more programs configured for execution by a computing device having one or more processors, the one or more programs comprising instructions for performing a method for training a speech emotion recognition (SER) model for use with a specific application or product, the method comprising:

generating a text transcript for a snippet of input speech;

applying, by the one or more processors, the text transcript to a pre-trained language model that is trained via token masking;

generating, using the pre-trained language model according to an engineered prompt and a predetermined taxonomy, a textual entailment from the text transcript, wherein the predetermined taxonomy (i) is chosen based on the specific application or product with which the SER model is used and (ii) includes a set of words or phrases corresponding to the specific application or product; and generating, using the textual entailment, a predicted emotion corresponding to the input speech, wherein the predicted emotion is applied as a weak label to train the SER model on the input speech for weakly-supervised learning of the SER model.

* * * * *